(12) United States Patent
Kitagawa

(10) Patent No.: US 6,496,406 B1
(45) Date of Patent: Dec. 17, 2002

(54) SYSTEMS FOR MANAGING OPTICAL DISK DRIVE PARAMETERS

(75) Inventor: Masayuki Kitagawa, Irvine, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/607,275

(22) Filed: Jun. 30, 2000

(51) Int. Cl.[7] ............................................. G11C 13/00
(52) U.S. Cl. ................................. 365/106; 365/64
(58) Field of Search .......................... 365/106, 149, 365/154, 122, 50, 51, 64; 369/47.54, 47.48, 30.04

(56) References Cited

U.S. PATENT DOCUMENTS

| | | | | |
|---|---|---|---|---|
| 5,598,391 A | * | 1/1997 | Mukawa | 369/54 |
| 5,675,559 A | * | 10/1997 | Maeda et al. | 369/32 |
| 5,790,484 A | * | 8/1998 | Maeda et al. | 369/32 |
| 6,141,306 A | * | 10/2000 | Andoh | 369/54 |
| 6,172,637 B1 | * | 1/2001 | Kugler | 341/158 |

* cited by examiner

*Primary Examiner*—Richard Elms
*Assistant Examiner*—Anh Phung
(74) *Attorney, Agent, or Firm*—Knobbe, Martens, Olson & Bear, LLP

(57) ABSTRACT

A system connected to a host computer is used to write in or read out data on a disc. The system includes a CD RW controller, a RAM, a $\mu$ processor, and a drive mechanism. The RAM, although functioning as a data buffer, receives instruction codes and variable parameters directly from the host computer. Based on the instruction codes and variable parameters, the $\mu$ processor and the CD RW controller work the drive mechanism to write in and/or read out data on a disc.

17 Claims, 3 Drawing Sheets

SYSTEMS FOR MANAGING OPTICAL DISK DRIVE PARAMETERS

BACKGROUND OF THE INVENTION

1. Field of the Invention

The present invention relates to optical disk drive methods and systems, and in particular to methods and systems for optical drive systems that can accommodate a variety of optical drive technologies.

2. Description of the Related Art

Because of the high capacities and relatively low costs associated with optical storage discs and drives, optical disc technologies, such as CD and DVD technologies, are frequently used to store data, programs, and multimedia. Many computer systems and the like utilize optical drives that can accommodate writable optical media, such as write-once CD disks, re-writable CD disks (CD-RW), and re-writable DVD disks (DVD-RW). This allows users to utilize optical media to archive data, or store programs, photos, audio files, video files, or the like.

Optical drives, such as CD-RW drive systems, are typically operated at least partly based on hard-coded instruction and parameters. The instruction codes may identify the type system to be controlled, such as the CD-RW system, the CD write once recordable system, the DVD-RW system, and so on. The hard coded parameters conventionally control parameters of drive system mechanisms, such as an optical pickup and a spindle motor. Thus, for example, the parameters controlled may include the laser write power, the spindle motor currents, servo currents, and the like.

SUMMARY OF THE INVENTION

The present invention is related to a system for writing in or reading out data on a medium. The system comprises a mechanism unit, a volatile memory, and a driving unit. The mechanism unit writes in or reads out data on a medium. The volatile memory stores mechanism driving information and data for writing in or reading out on the medium from an external apparatus. The driving unit activates the mechanism unit in response to the mechanism driving information, and sends the data to said mechanism unit.

The present invention is also related to a method for writing in or reading out data on a medium using a mechanism unit, a volatile memory, and a driving unit. The method detects a type of mechanism unit by the driving unit, stores into the volatile memory mechanism driving information corresponding to the mechanism unit detected from an external apparatus, and furnishes the mechanism driving information to the mechanism unit through the driving unit for activation. Then the method stores data for writing in or reading out into the volatile memory from the external apparatus, and furnishes the data to the mechanism unit through the driving unit for writing in or reading out on the medium.

The present invention can flexibly adapt to a variety of optical drive technologies. For example, in one embodiment, the same controller can be used with write-once CD optical drives, re-writable CD (CD-RW) optical drives, and re-writable DVD (DVD-RW) optical drives Thus, in accordance with one embodiment of the present invention, a drive. memory is used both as a buffer memory, and also to store data that is typically hard coded, such as disk drive operating parameters. Since one system can be changed to another type of system by replacing information in the drive memory with information for another type, the embodiment of the invention can produce flexibility and economic efficiency.

DETAILED DESCRIPTION OF PREFERRED EMBODIMENTS

The present invention relates methods and systems for optical drive systems that can accommodate a variety of optical drive technologies. Though the following embodiment is discussed with reference to CD optical drive systems, the present invention is in no way limited to a specific optical drive technology, and can accommodate DVD and other technologies as well.

Figure 1:
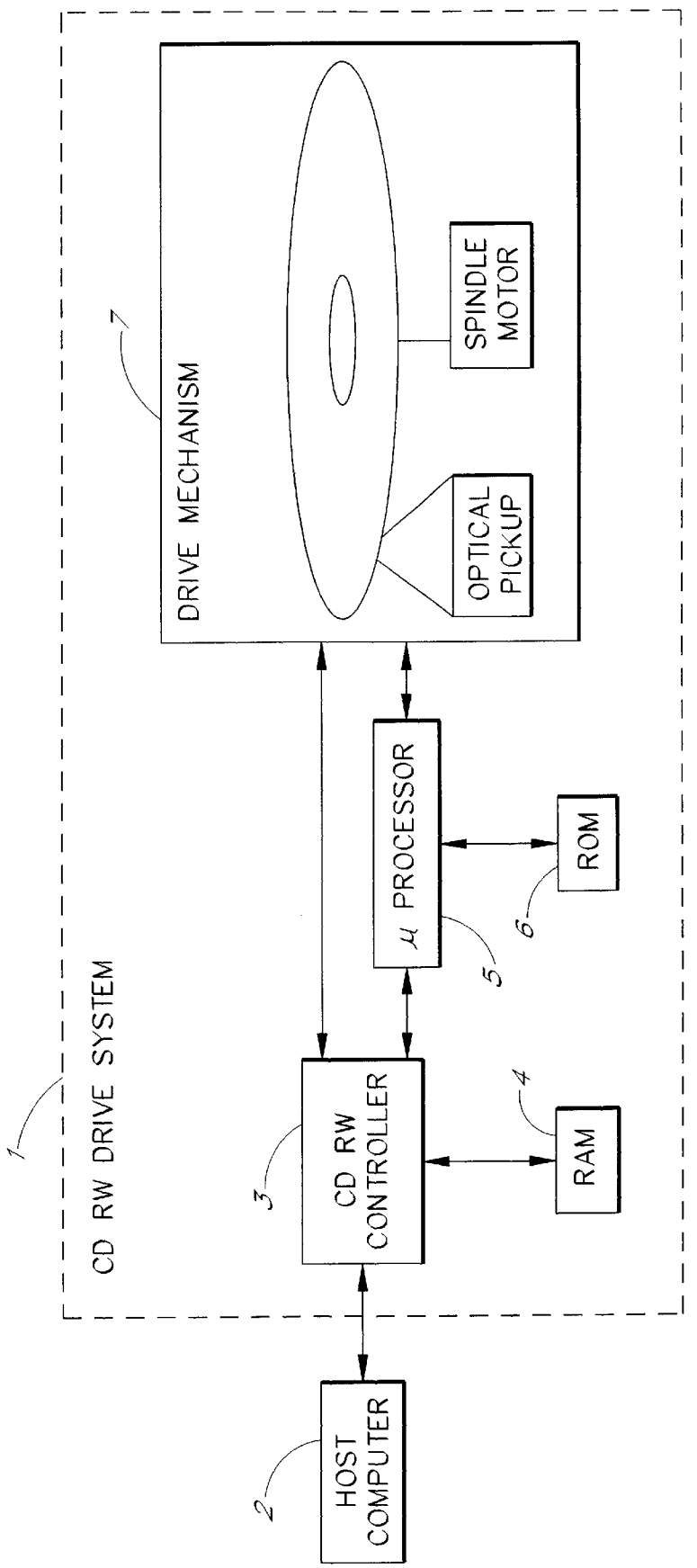
FIG. 1 is a block diagram illustrating a conventional CD-RW drive system related to the present invention.

FIG. 1 illustrates a conventional CD-RW drive system 1 related to the present invention. The CD-RW drive system 1 is connected to a host computer 2, such as a personal computer, over a bus through an interface (not shown), such as a USB or Fibre Channel bus interface. The system 1 includes a compact disc re-writable (CD-RW) controller 3, a random-access memory (RAM) 4, a microprocessor ($\mu$ processor) 5, a read-only memory (ROM) 6 and a drive mechanism 7. The drive mechanism 7 includes a drive unit, such as a spindle motor, used to rotate an optical disc, a table (not shown) on which the optical disk is to be placed, and an optical pickup used to read and write data from or to the optical disc. The optical pickup includes a laser (not shown) used for the purpose.

The CD-RW controller 3 is connected to the host computer 2 to receive and send commands and data to and from the host computer 2 over a bus. These commands include write control information, such as optical pickup currents and spindle motor currents. The CD-RW controller 3 is also connected to the RAM 4 over a bus to receive and send data to and from the RAM 4, which functions as a data buffer. In addition, the CD-RW controller 3 is connected to the drive mechanism 7 over a bus to send and receive data to and from the drive mechanism 7. The drive mechanism 7 includes an optical pickup for writing data to and/or reading out data from the surface of a disc, a sled motor (not shown) for moving the pickup in the radial direction of the disc and driving circuits (not shown) for the sled motor, and a spindle motor for controlling the rotation of the disc and spindle motor driving circuits (not shown).

The $\mu$ processor 5 is connected to the CD-RW controller 3 through a bus to send and receive commands to and from the CD-RW controller 3. The $\mu$ processor 5 is also connected via data and address busses to the ROM 6 to send address data to and receive data from the ROM 6, which stores instruction codes and variable parameters at specified addresses. In the exemplary system being described, the instruction codes includes codes which identify the type system to be driven, such as the CD-RW system, the CD recordable (CD-R) system, the DVD read only system, the DVD-RW system, or other systems, and also includes codes for playing a CD disk, resuming play, or other play-related functions. An exemplary list of instruction codes is as follows:

The first term means a balance between a Main area and a Sub area in a CD disk. The second term means Reading a Current Parameter of a DAC (Digital-to-Analog Converter).

```
(1) Playing a CD disc
enum DISC-STATE disc_play (DISC_C *cmd)
{
    uchar min,sec,frm;
    cmd->status = DISC_COMMAND_ACTIVE;
    DecoderReset(0);
    DiscSpeed          = 1;
    DecodeOption.x     = cmd->p.seek.servo_mode;
    PlayStartAddress.lba = cmd-p.play.play_start_address.lba.dword;
    PlayStopAddress.lba  = cmd-p.play.play_stop_address.lba.dword;
    DecodeOption.x     = cmd->p.play.flag.byte;
    AudioExtraction = 0;
    DiscTaskSense = NO_SENSE;
    PlayAudioStatus = CLEAR_AUDIO_STATUS;
    if(DecodeOption.bit.address_mode) {
        DStartMin = PlayStartAddress.byte.min;
        DStartSec = PlayStartAddress.byte.sec;
        DStartFrm = PlayStartAddress.byte.frm;
        DStopMin = PlayStopAddress.byte.min;
        DStopSec = PlayStopAddress.byte.sec;
        DStopFrm = PlayStopAddress.byte.frm;
    }
    else{
        block_to_time((volatile uchar *)&min, (volatile uchar *)&sec,(volatile uchar*)&frm, PlayStartAddress.lba);
        DStartMin = min;
        DStartSec = sec;
        DStartFrm = frm;
        block_to_time((volatile uchar *)&min,(volatile uchar *)&sec,(volatile uchar *)&frm, PlayStopAddress.lba);
        DStopMin = min;
        DStopSec = sec;
        DStopFrm = frm;
    }
    ReqSpeedSelect(1);
    return DISC_PLAY_SPEED_SEL_COMP_STATE;
}
(2) Resuming play
enum DISC_STATE disc_play_resume(DISC_C *cmd)
{
    if{cmd->audio_status == AUDIO_PAUSE) {
        return DISC_PLAY_SEEK_STATE;
    }
    else{
        return DISC_PLAY_DONE_STATE;
    }
}
```

Some other examples of the instruction code are attached as Appendix A.

The Variable parameters, on the other hand, are used to control the drive mechanism operating points. To be more specific, the parameters include driving currents for the pickup, the sled motor, and the spindle motor, and also include the parameters for playing the CD system, writing the CD-R system, and erasing the CD-Rw system. An exemplary list of the variable parameters for playing the CD system is shown below:

```
GLOBAL struct
{
    unsigned char MainSubBalance;
    unsigned char RdiDac
    unsigned char WriDac
    unsigned char TrOffsetDac
}
```

The third term means Writing a Current Parameter of a DAC. The fourth term means Tracking Offset of a DAC.

The micro codes and variable parameters consist of C language and may occupy 256 to 512 Kbytes. The $\mu$ processor 5 is further connected to the drive mechanism 7 via a bus to send and receive commands to and from the drive mechanism 7.

Figure 2:
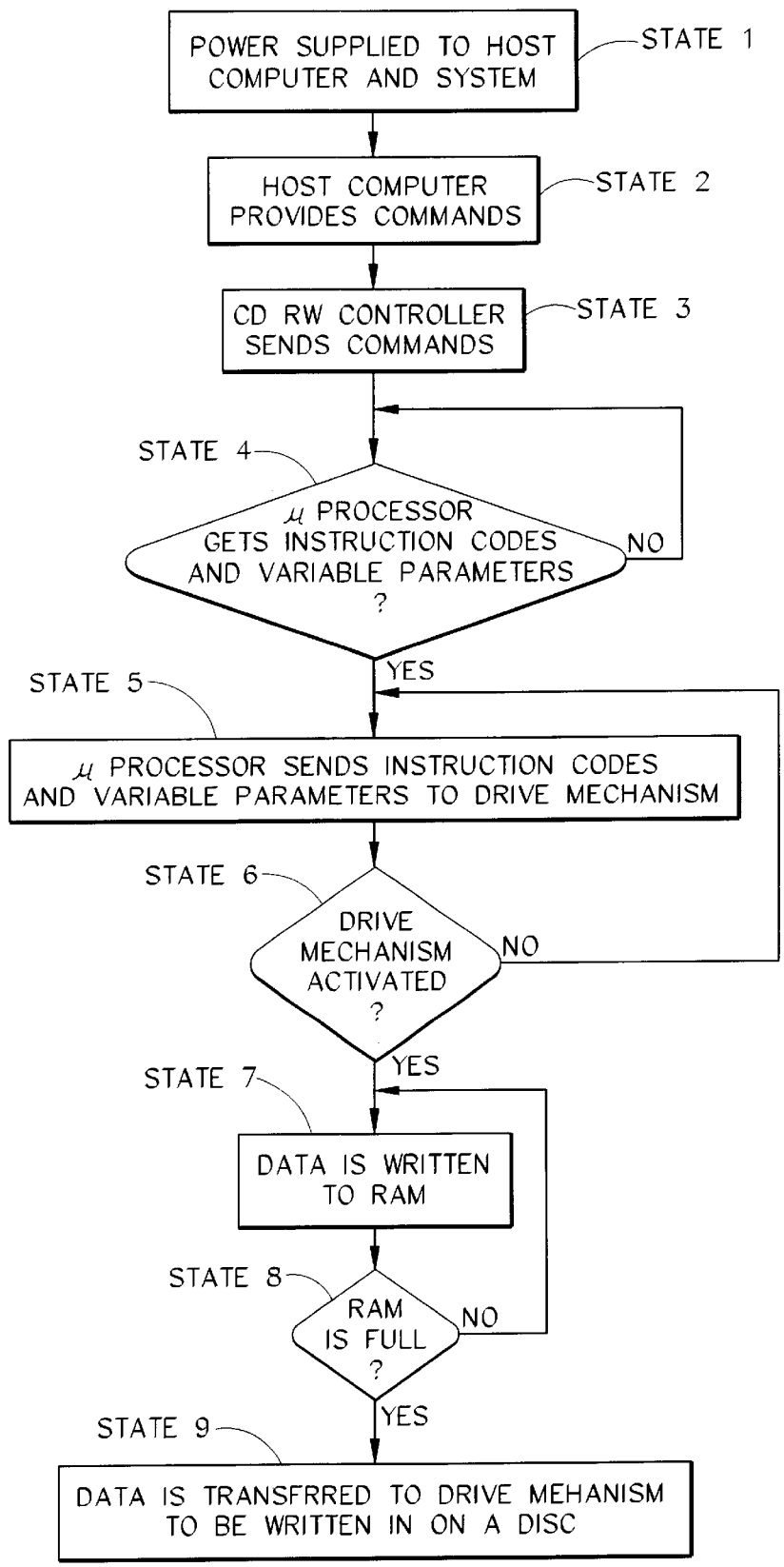
FIG. 2 is a flow chart illustrating an initialization sequence of the drive system of FIG. 1

FIG. 2 is a flow chart illustrating an initialization sequence or process for the system 1 illustrated in FIG. 1. At state 1, when power is supplied to all the components 3–7 of the system 1 and the host computer 2, the components 3–7 are ready to receive commands and data from the host computer 2. At state 2, the host computer 2 supplies commands to the CD-RW controller 3. At state 3, the controller 3 sends out the commands to the $\mu$ processor 5 which in turn sends out them to the ROM 6.

At state 4, it is decided whether the $\mu$ processor 5 reads out instruction codes and variable parameters stored at specific addresses of the ROM 6 and transfers instruction codes and variable parameters to the drive mechanism 7 to set-up and activate the drive mechanism 7. When the $\mu$ processor 5 gets the instruction codes and variable parameters, at state 5 the µ processor 5 sends the instruction codes and variable parameters to the drive mechanism 7.

In state 6, it is decided whether the drive mechanism 7 is activated such as turning on a laser of the pickup, rotating a disc, etc. If the drive mechanism 7 is activated, in state 7 data from the computer 2 is written to the RAM 4 until the RAM 4 is full. In state 8, it is decided whether the RAM 4 is full. When it is judged that the RAM 4 is not full, more data is written to the RAM 4. If, instead, the RAM 4 is full, the process proceeds to state 9, and the controller 3 begins to transfer the data from the RAM 4 to the drive mechanism 7 at a constant speed, where the data is written to the optical disc. In this way, when the system 1 is in operation, data is transferred from the RAM 4 to the pickup via the controller 3 to thereby write data on the disc at a constant speed.

Since the ROM stores the instruction codes and variable parameters, it enables the system to be simple and economical.

However, there is a major drawback with this conventional system. That is, in the system, the ROM stores the instruction codes and variable parameters only for the CD-RW drive system; therefore, when the CD-RW drive system has to be replaced by other systems for commercial sale in a market, such as a CD recordable system, a video CD replay system, an audio CD replay system, or a CD ROM write-in system, the ROM cannot be used any more. Instead, another type of ROM with the specific instruction codes and variable parameters for a particular system will have to be used. Every time a new system is introduced, a new ROM according to the system must be employed. It can be said that any system having a ROM with instruction codes and variable parameters lacks flexibility and impedes adaptability for a new system, which leads to an embodiment in accordance with the invention described below.

Figure 3:
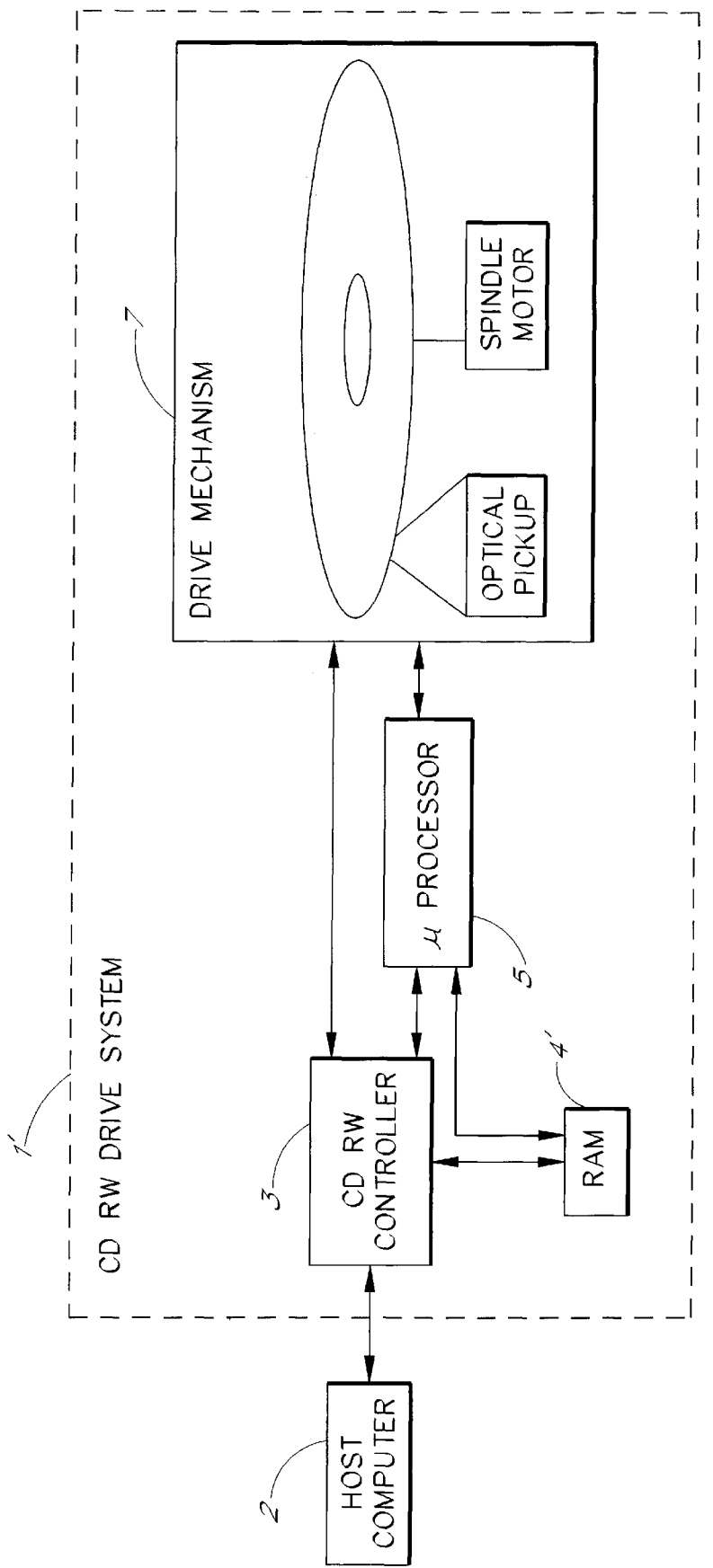
FIG. 3 is a block diagram illustrating an embodiment of a CD-RW drive system in accordance with the present invention.

FIG. 3 is a block diagram illustrating an embodiment of a CD-RW drive system according to the present invention. In FIGS. 1 and 3, the same reference numbers are used to represent the same elements. Therefore, an explanation of the elements already explained above will not be made. The difference between FIG. 1 and FIG. 3 lies in the fact that: in FIG. 3, the ROM 6 is deleted, and there is provided another RAM 4' instead of the RAM 4, which in turn reflects the system 1' instead of the system 1. Only a description of the differences will follow.

The RAM 4' functions as a data buffer as the RAM 4 does. In addition to that, when the host computer 2 determines that based on the detection of the kind of the drive mechanism 7 by the CD-RW controller 3, the drive mechanism 7 is used for the CD-RW drive system, it send out the instruction codes and variable parameters for the drive mechanism 7 to the RAM 4', which in turn stores them. That is to say, the host computer 2 transfers the instruction codes and variable parameters directly to the RAM 4'. This excludes a ROM which stores those data beforehand. In this way, the RAM 4' plays a role of a ROM in the conventional system. Even if the system 1 is changed to another type of system, the RAM 4' does not have to be replaced with another element; all that has to be done is to change data for the instruction codes and variable parameters in the host computer 2 and to transfer them into the RAM 4'. The µ processor directly accesses the RAM 4' for retrieval of the instruction codes and variable parameters and the data.

The embodiment of the invention can provide flexibility to accommodate to a new type of system. Since the number of components remains the same even if one system is changed to another type of system, the embodiment achieve economic efficiency.

When starting operation, the µ processor 5 gets the instruction codes and variable parameters for the drive mechanism 7 from the RAM 4' to feed them to the drive mechanism 7. Except for this, since other actions are the same as those already described with regard to the conventional system of FIG. 1, no same explanation will be provided. In this embodiment, memory capacity of the RAM 4' is 4 M bytes. The RAM 4' may be, by way of example, a dynamic random-access memory (DRAM) or a static random-access memory (SRAM).

Other embodiments may be devised by those skilled in the art as follows. The host computer 2 may be replaced by a CD ROM player which derives information from a disc to furnish it to the CD-RW controller. Moreover, the host computer 2 can be replaced by a network which sends out information to the CD-RW controller.

Data and the instruction codes and variable parameters can be supplied to the host computer 2 from a floppy disc, a CD ROM, a network, and even a server. Accordingly, in a factory, using a server that can finish data and the instruction codes and variable parameters to the host computer 2, the present system may be converted to another system with ease. Likewise, at a client who is using the present system, using a network, the present system may be converted to another system.

The host computer 2 is generally connected to AC power supply to get power from it. But the host computer 2 can be disconnected from the power supply and connected to a battery. The battery maintains the CD-RW drive system 1 active and keeps the information stored in the DRAM 4'. This embodiment is applicable to an apparatus without AC power, such as a digital camera or a portable computer, which may include a disc drive system.

It should be understood that the detailed description of the preferred embodiment is given as an example and not a limitation. Many changes and modifications to the invention are possible without departing from the spirit and scope of the invention, and all such modifications are included in the claims appended hereto.

---

APPENDIX A

```
Pausing play
enum DISC_STATE disc_play_pause(DISC_C *cmd)
{
    union MECHA_ACTION mecha_action;
    cmd->status=DISC_COMMAND_ACTIVE;
    mecha_action.x = Mecha_action;
    if(mecha_action.bit.MechaCmp) {
        return DISC_PLAY_PAUSE_STATE;
    }
    else{
        ReqHold( );
        DiscTaskSense    = NO_SENSE;
        PlayAudioStatus  = CLEAR_AUDIO_STATUS;
        return DISC_PLAY_FINAL_STATE:
    }
}
Stopping play
enum DISC_STATE disc_play_stop(DISC_C *cmd)
{
    union MECHA>ACTION mecha_action;
    cmd->status=DISC_COMMAND_ACTIVE;
    mecha_action.x=Mecha_action;
    if(mecha_action.bit.MechaCmp) {
        return DISC_PLAY_STOP_STATE;
```

APPENDIX A-continued

```
    }
    else{
        ReqStop( );
        DiscTaskSense = NO_SENSE;
        PlayAudioStatus = CLEAR_AUDIO_STATUS;
        return DISC_PLAY_FINAL_STATE;
    }
}
```

What is claimed is:

1. A system for writing in or reading out data on a medium, comprising:

a drive unit for writing in or reading out data on a medium;

a volatile memory for receiving mechanism driving information related to a system type and data for writing in or reading out on the medium from an external apparatus, an storing the mechanism driving information and data; and a control unit for activating said drive unit in response to the mechanism driving information and sending the data to said drive unit.

a driving unit for activating said mechanism unit in response to the mechanism driving information and sending the data to said mechanism unit.

2. The system according to claim 1, wherein said volatile memory is any of a RAM, a DRAM or a SRAM.

3. The system according to claim 1, wherein said volatile memory stores said data for writing in or reading out.

4. The system according to claim 1, wherein said external apparatus is any one of a computer, a CD player or a network.

5. The system according to claim 1, wherein said external apparatus can be disconnected from said system after the data is furnished to said system, and said volatile memory is operated by a battery.

6. The system according to claim 1, wherein said mechanism driving information includes instruction codes and variable parameters.

7. The system according to claim 1, wherein said driving unit includes a microprocessor.

8. The new system according to claim 1, wherein the mechanism driving information compromises instruction codes that identify the system type, and variable parameters that control parameters of said drive unit or said control unit.

9. A system for writing in or reading out data on a medium, compromising:

means for writing in or reading out data on the medium;

means receiving mechanism driving information related to system type and data for writing in or reading out on the medium from external apparatus, and storing the mechanism driving information and the data; and means for activating said means for writing in response to the mechanism driving information and sending the data to said means for writing.

10. The system according to claim 9, wherein said means for receiving is any of a RAM, a DRAM or a SRAM.

11. The system according to claim 9, wherein said means for receiving stores said data for writing in or reading out.

12. The system according to claim 9, wherein said external apparatus is any one of a computer, a CD player or a network.

13. The system according to claim 9, wherein said external apparatus can be disconnected from said system after the data is furnished to said system, and said means for receiving is operated by a battery.

14. The system according to claim 9, wherein said mechanism driving information includes instruction codes and variable parameters.

15. The system according to claim 9, wherein said means for activating includes a microprocessor.

16. The system according to claim 9, wherein said mechanism driving information comprises instruction codes that identify the system type, and variable parameters that control parameters of said means for writing or said means for activating.

17. A system for writing in or reading out data on a medium, comprising:

a drive unit for writing in or reading out data on the medium;

a volatile memory for receiving instruction codes that identifies a system type, and variable parameters, and data for writing on or reading out on the medium from an external apparatus, and storing the instruction codes and variable parameters and the data; and a control unit for activating the drive unit response to the instruction codes and variable parameters and sending the data to the drive unit;

wherein the medium is an optical disk, and the variable parameters controls parameters of the drive unit on the control unit.

* * * * *

UNITED STATES PATENT AND TRADEMARK OFFICE
CERTIFICATE OF CORRECTION

PATENT NO. : 6,496,406 B1  Page 1 of 1
DATED : December 17, 2002
INVENTOR(S) : Masayuki Kitagawa It is certified that error appears in the above-identified patent and that said Letters Patent is hereby corrected as shown below:

<u>Column 7,</u>
Line 16, "on a" should be -- on the --
Line 21, "an" should be -- and --
Line 22, "and data" should be -- and the data --
Lines 26-28, delete "a driving...unit"
Line 44, "driving" should be -- control --
Line 47, "compromises" should be -- comprises --

<u>Column 8,</u>
Line 2, "compromising" should be -- comprising --
Line 4, "means receiving" should be -- means for receiving --

Signed and Sealed this

Seventeenth Day of February, 2004

JON W. DUDAS
*Acting Director of the United States Patent and Trademark Office*